May 4, 1926.
E. M. HOOVER
1,583,554
STUD SETTER
Filed June 23, 1924
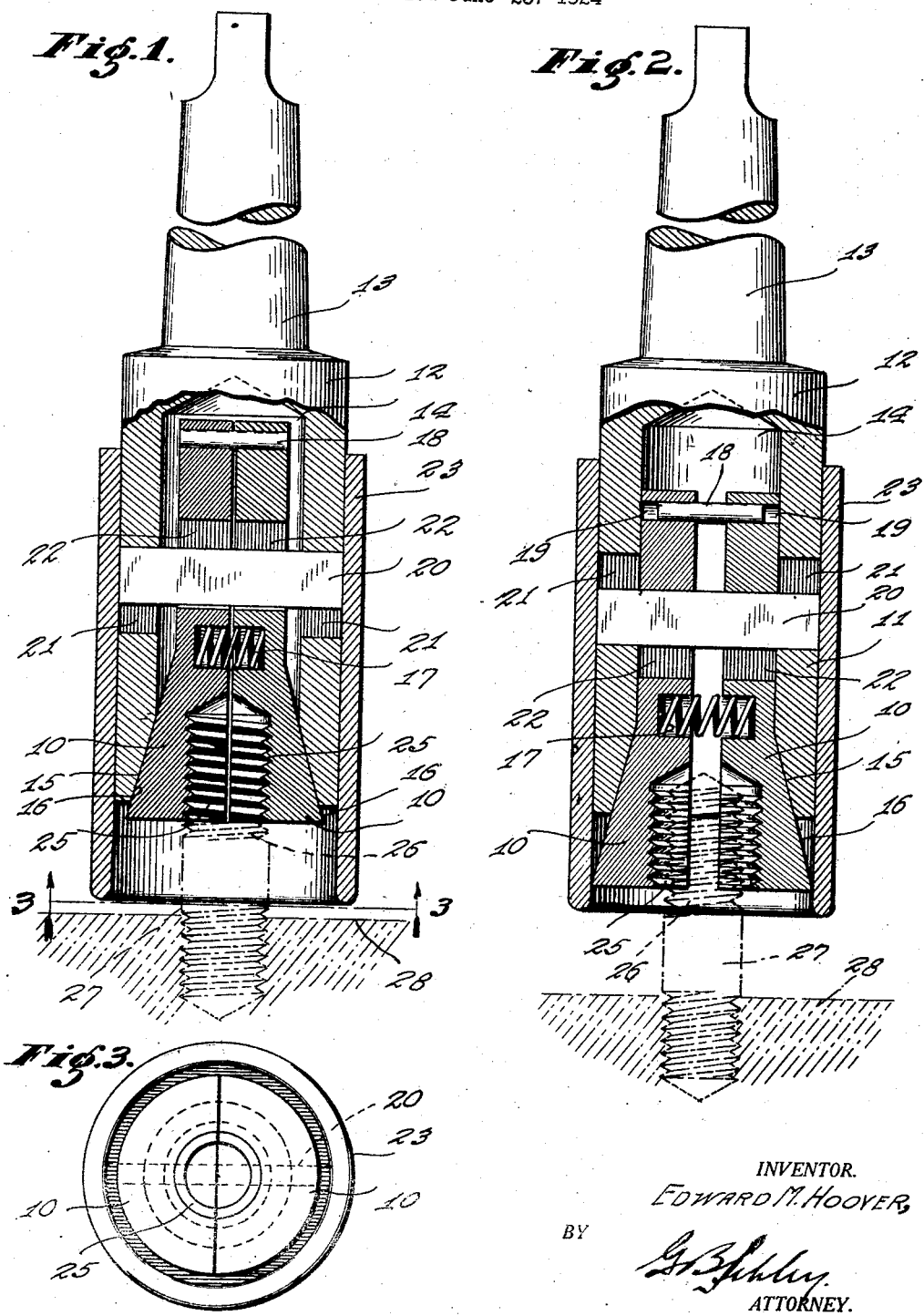
INVENTOR.
EDWARD M. HOOVER,
BY
ATTORNEY.

Patented May 4, 1926.

1,583,554

UNITED STATES PATENT OFFICE.

EDWARD M. HOOVER, OF ANDERSON, INDIANA, ASSIGNOR TO THE MANUFACTURING EQUIPMENT COMPANY, OF ANDERSON, INDIANA, A CORPORATION OF INDIANA.

STUD SETTER.

Application filed June 23, 1924. Serial No. 721,645.

*To all whom it may concern:*

Be it known that I, EDWARD M. HOOVER, a citizen of the United States, residing at Anderson, in the county of Madison and State of Indiana, have invented a new and useful Stud Setter, of which the following is a specification.

My invention relates to devices for setting stud bolts.

It is the object of my invention to produce a stud setter which can be operated to set stud bolts with ease and rapidity without requiring stopping or reversal of the stud setter to grip and release these stud bolts.

The accompanying drawing illustrates my invention: Fig. 1 is a longitudinal section through a stud setter embodying my invention, with the jaws gripping a stud bolt; Fig. 2 is a view similar to Fig. 1, with the jaws in position to release the stud bolt; and Fig. 3 is a section on the line 3—3 of Fig. 1.

My stud setter has two mating gripping jaws 10 mounted in the hollow lower end 11 of a main carrying member 12, which may be supported for rotation in any suitable way, as by an upward supporting shank 13 by which it may be mounted in the rotating head of any suitable machine, such as a drill-press or lathe. The lower end 11 of the carrying member has a longitudinal bore 14 for receiving the gripping jaws 10, and the lower end or mouth 15 of this bore 14 is made conically flaring. The conically flaring mouth 15 co-operates with the outer surfaces 16 of the lower parts of the jaws 10, which outer surfaces 16 are substantially semi-conical. The upper ends of the jaws 10 are substantially semi-cylindrical exteriorly, and extend into the cylindrical part of the bore 14; but they do not fill such bore, so that when the jaws 10 are lowered in the carrying member 12, as indicated in Fig. 2, the jaw members may be separated by a considerable distance. Preferably a compression spring 17 is located in mating sockets in the adjacent faces of the two jaws 10 to tend to separate such jaws. When the jaws 10 are forced upward into the bore 14, as indicated in Fig. 1, they are forced together against the spring 17, by the interaction of the conically flaring mouth 15 with the semi-conical surfaces 16. The two jaws 10 are preferably prevented from independent longitudinal movement in the bore 14 in some suitable way, as by a sliding cross-pin 18 having a sliding fit in mating transverse holes 19 in the upper ends of said jaws. The longitudinal movement of the jaws 10 in the carrying member 12 is limited in any suitable way, conveniently by a cross-key 20 passing through slots 21 in the walls of the carrying member 12 and through slots 22 in the jaws 10 between the spring 17 and the cross-pin 18. By having slots in both the carrying member 12 and the jaws, such slots may be made shorter than would be necessary if the same movement were provided with the slots in only one of such members. To provide a finished exterior, as well as to hold the cross-key 20 in place, I preferably provide an outer sleeve 23, which surrounds the carrying member 12 and projects somewhat below the lower end thereof. This sleeve also effectively protects the jaws 10. This sleeve, however, is not essential to my invention.

At their joint lower end, the jaws 10 are provided with an axial internal bore having an internal screw-thread 25, of which half is in each jaw 10. The two halves of this internal thread are relatively movable transverse to their axis, by the separation and coming together of the two jaws. The thread 25 corresponds to the thread 26 on the stud-bolt 27 which the stud setter is to handle for setting into a stud-receiving part 28. By the coming together of the two jaws 10, they grip the thread 26 of a stud-bolt 27 inserted between such jaws; while by the separation of said jaws they release said stud-bolt.

In operation, any desired number of stud-bolts 27 may be started by hand into one or more stud-receiving plates 28. Then the stud setter is applied to such stud-bolts separately. For this purpose, the stud setter is rotatably carried in any suitable way which permits its axial movement relative to the stud-receiving member 28. As the stud setter is depressed over any stud-bolt 27, the stud-bolt pushes the two jaws 10 relatively upward in their supporting member 11, and thus draws the two jaws together by the interaction of the surfaces 15 and 16. As such jaws come together, they grip between them the thread 26 on the upper end of the stud-bolt 27, and do so without marring such thread. This is done while the stud setter is in rotation. In consequence, as soon as the gripping occurs, the stud-bolt 27 starts to rotate, and is thus turned into its threaded hole in the stud-receiving member 28 as the stud setter descends. When the stud-bolt has advanced as far as desired, the operator stops the descent of the stud setter, and merely moves it back upward, without stopping its rotation unless that is desired for some other reason. As the stud setter is moved upward, the jaws 10 are drawn relatively downward in the carrying member 12 at first by the interaction of the threads 25 and 26; and are spread apart by the spring 17 as permitted by the surfaces 15 and 16. By such spreading apart, the jaws are released from the stud-bolt 27, leaving the latter in place, after which the stud setter may freely be lifted clear of such stud-bolt, and moved to another stud-bolt all without stopping the forward rotation of the stud setter or requiring its reverse rotation.

While I have shown only two jaws 10, each containing substantially half of the thread 25, my invention is not limited to this small number of jaws or to the presence of so much of the thread in any one jaw; for I have shown two jaws merely as one simple embodiment of the invention, and the number of jaws may be anything desired.

I claim as my invention:

1. A stud setter, comprising a rotatable carrying member having a longitudinal bore, a plurality of jaws mounted in said bore and movable longitudinally thereof either direction by force longitudinally applied, said jaws and said bore being provided with mating wholly conical tapered surfaces which produce relative transverse movement between said jaws upon such longitudinal movement in said bore and being rotationally drivingly interconnected so that turning of said carrying member always produces turning of said jaws therewith, and a spring tending to separate said jaws transversely, said jaws having an internal thread of which the parts are relatively movable by the relative transverse movement of said jaws.

2. A stud setter, comprising a rotatable carrying member having a longitudinal bore, and a plurality of jaws mounted in said bore and movable longitudinally thereof in either direction by force longitudinally applied, said jaws and said bore being provided with mating wholly conical tapered surfaces which produce relative transverse movement between said jaws upon such longitudinal movement in said bore and being rotationally drivingly interconnected so that turning of said carrying member produces turning of said jaws therewith, such longitudinal movement of the jaws in the bore being independent of any turning of the jaws in the bore, said jaws having an internal thread of which the parts are relatively movable by the relative transverse movement of said jaws.

3. A stud setter, comprising a rotatable carrying member having a longitudinal bore, a plurality of jaws mounted in said bore and movable longitudinally thereof in either direction by force longitudinally applied, said jaws and said carrying member being provided with means for causing such longitudinal movement of the jaws in said carrying member to be accompanied by a transverse relative movement between the jaws and being always rotationally drivingly interconnected independently of said means, and a spring tending to separate said jaws transversely, said jaws having an internal thread of which the parts are relatively movable by the relative transverse movement of said jaws.

4. A stud setter, comprising a rotatable carrying member having a longitudinal bore, and a plurality of jaws mounted in said bore and movable longitudinally thereof in either direction by force longitudinally applied, said jaws and said carrying member being provided with means for causing such longitudinal movement of the jaws in said carrying member to be accompanied by a transverse relative movement between the jaws and being rotationally drivingly interconnected independently of said means, such longitudinal movement of the jaws in the bore being independent of any turning of the jaws in the bore, said jaws having an internal thread of which the parts are relatively movable by the relative transverse movement of said jaws.

5. A stud setter, comprising a rotatable carrying member having a longitudinal bore, a plurality of jaws mounted in said bore and movable longitudinally thereof in either direction by force longitudinally applied, said jaws and said carrying member being provided with means for causing such longitudinal movement of the jaws in said carrying member to be accompanied by a transverse relative movement between the jaws and being rotationally drivingly interconnected independently of said means, such longitudinal movement of the jaws in the bore being independent of any turning of the jaws in the bore, said jaws having an internal thread of which the parts are relatively movable by the relative transverse movement of said jaws, and means for limiting the longitudinal movement of said jaws in said carrying member.

6. A stud setter, comprising a rotatable carrying member having a longitudinal bore, a plurality of jaws mounted in said bore and movable longitudinally thereof in either direction by force longitudinally applied, said jaws and said carrying member being provided with means for causing such longitudinal movement of the jaws in said carrying member to be accompanied by a transverse relative movement between the jaws and being always rotationally drivingly interconnected independently of said means, said jaws having an internal thread of which the parts are relatively movable by the relative transverse movement of said jaws, and means for preventing longitudinal movement of said jaws in said carrying member independently of one another.

7. A stud setter, comprising a rotatable carrying member having a longitudinal bore, a plurality of jaws mounted in said bore and movable longitudinally thereof in either direction by force longitudinally applied, said jaws and said bore being provided with mating wholly conical tapered surfaces which produce relative transverse movement between said jaws upon such longitudinal movement in said bore, said jaws having an internal thread of which the parts are relatively movable by the relative transverse movement of said jaws, and a cross-bar rotationally interconnecting said pair of jaws to said carrying member and in at least one of them playing in wholly longitudinal slots.

8. A stud setter, comprising a rotatable carrying member having a longitudinal bore, a plurality of jaws mounted in said bore and movable longitudinally thereof in either direction by force longitudinally applied, said jaws and said bore being provided with mating wholly conical tapered surfaces which produce relative transverse movement between said jaws upon such longitudinal movement in said bore, such longitudinal movement of the jaws in the bore being independent of any turning of the jaws in the bore, said jaws having an internal thread of which the parts are relatively movable by the relative transverse movement of said jaws, and a cross-bar rotationally interconnecting said pair of jaws to said carrying member and in at least one of them playing in slots which permit such longitudinal movement.

In witness whereof, I have hereunto set my hand at Indianapolis, Indiana, this 17th day of April, A. D. one thousand nine hundred and twenty-four.

EDWARD M. HOOVER.